(12) United States Patent
Kim

(10) Patent No.: US 9,208,541 B2
(45) Date of Patent: Dec. 8, 2015

(54) APPARATUS AND METHOD FOR CORRECTING DISPARITY MAP

(75) Inventor: Kap-Kee Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 896 days.

(21) Appl. No.: 13/316,655

(22) Filed: Dec. 12, 2011

(65) Prior Publication Data

US 2012/0155743 A1 Jun. 21, 2012

(30) Foreign Application Priority Data

Dec. 15, 2010 (KR) .................. 10-2010-0128648

(51) Int. Cl.
*G06K 9/00* (2006.01)
*G06T 5/00* (2006.01)
*G06T 5/50* (2006.01)

(52) U.S. Cl.
CPC ............... *G06T 5/002* (2013.01); *G06T 5/005* (2013.01); *G06T 5/50* (2013.01); *G06T 2207/10021* (2013.01); *G06T 2207/20144* (2013.01); *G06T 2207/20182* (2013.01)

(58) Field of Classification Search
None
See application file for complete search history.

(56) References Cited

U.S. PATENT DOCUMENTS

2007/0296721 A1* 12/2007 Chang et al. ................... 345/427
2010/0195898 A1* 8/2010 Bang et al. .................... 382/154

FOREIGN PATENT DOCUMENTS

KR 1020100087685 A 8/2010

OTHER PUBLICATIONS

Thabo Beeler, et al; "High-Quality Single-Shot Capture of Facial Geometry", Published in: ACM Transactions on Graphics (TOG)—Proceedings of ACM SIGGRAPH 2010, vol. 29, Issue 4, Jul. 2010, 9 pages.

* cited by examiner

*Primary Examiner* — Kim Vu
*Assistant Examiner* — Fred Hu
(74) *Attorney, Agent, or Firm* — Ladas & Parry LLP

(57) ABSTRACT

Disclosed herein are an apparatus and method for correcting a disparity map. The apparatus includes a disparity map area setting unit, a pose estimation unit, and a disparity map correction unit. The apparatus removes the noise of the disparity map attributable to stereo matching and also fills in holes attributable to occlusion using information about the depth of a 3-dimensional (3D) model produced in a preceding frame of a current frame, thereby improving a disparity map and depth performance and providing high-accuracy depth information to an application to be used.

13 Claims, 4 Drawing Sheets

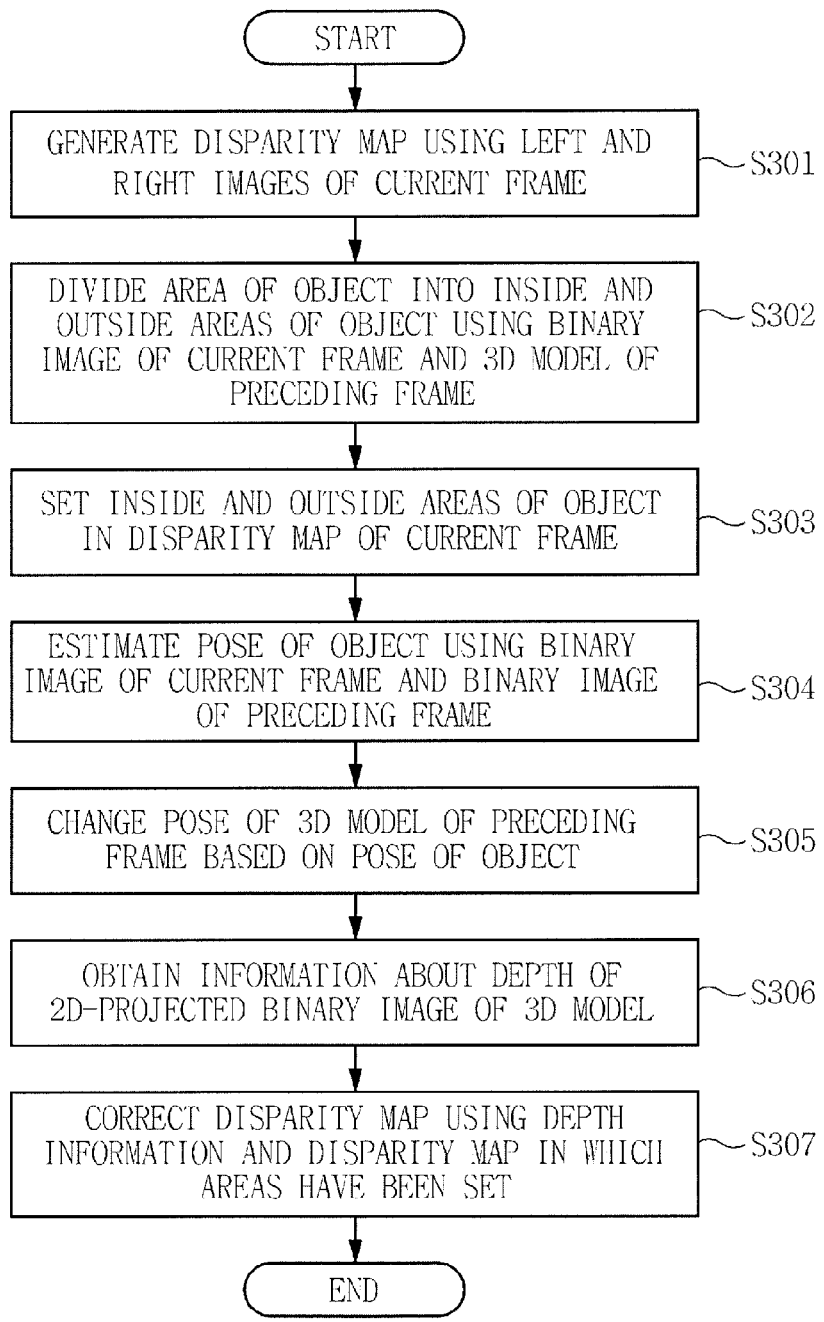

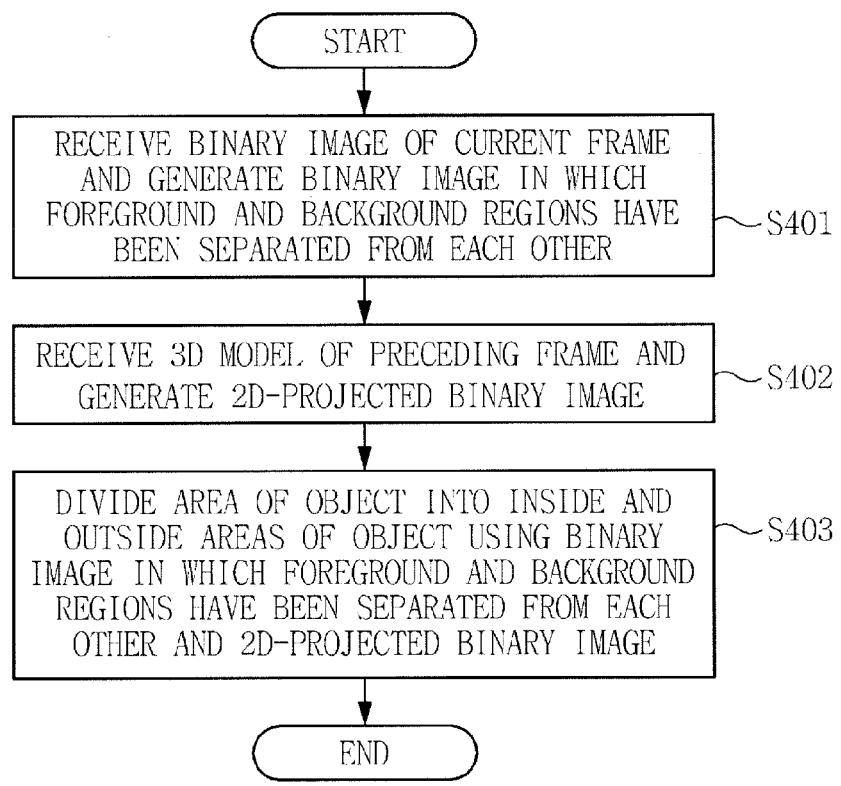

APPARATUS AND METHOD FOR CORRECTING DISPARITY MAP

CROSS REFERENCE TO RELATED APPLICATION

This application claims the benefit of Korean Patent Application No. 10-2010-0128648, filed on Dec. 15, 2010, which is hereby incorporated by reference in its entirety into this application.

BACKGROUND OF THE INVENTION

1. Technical Field

The present invention relates generally to an apparatus and method for correcting a disparity map and, more particularly, to an apparatus and method for correcting a disparity map, which removes the noise of the disparity map attributable to stereo matching and also fills in holes attributable to occlusion using information about the depth of a 3-dimensional (3D) model produced in a preceding frame of a current frame, thereby improving a disparity map and depth performance and providing high-accuracy depth information to an application to be used.

2. Description of the Related Art

The human visual system has been known to obtain distance information by appropriately matching two images obtained at different positions. Stereo matching corresponds to a field related to computer vision that seeks to automate the ability of the human visual system to extract the distance. This method has been widely used in medical imaging, factory automation and map production because it is more effective than a method of measuring the distance as a function of the traveling time and speed of light by using ultrasonic waves and a laser as a light source and because it is less restricted by the actual application environment.

The results of stereo matching are output as a disparity map. The disparity map is a map where pixel-based positional disparity values are plotted at corresponding coordinates based on one of left and right images. The disparity map is also called a depth map. The disparity map may be converted into distances using a formula, and such distances may be changed into depth information.

Although there are a variety of stereo matching methods, an error is generated in a disparity map because no stereo matching method is perfect. Many errors are caused by limitations in the algorithms themselves or problems with the acquired image data. For example, occlusion, in which an object is seen in only one of the left and right images, results from the limitations of an algorithm itself, and noise, in which an object is seen both on the left and right images but the pixel color values of the object are different on the left and right images, results from a problem with the acquired image data. Saturation attributable to the reflection of light off the image may be generated in either case. Such errors need to be corrected because they may lead to inaccurate depth information.

A conventional method for solving the above problems includes a method of correcting errors using the adjacent disparity values of a current frame. However, this method is problematic because any error stemming from a portion where an adjacent disparity value is considerably different from a disparity value in a portion where an error is generated (e.g., a boundary portion) cannot be accurately corrected.

SUMMARY OF THE INVENTION

Accordingly, an object of the present invention is to provide an apparatus and method for correcting a disparity map, which removes the noise of the disparity map attributable to stereo matching and also fills in holes attributable to occlusion using information about the depth of a 3D model produced in a preceding frame of a current frame, thereby improving a disparity map and depth performance and providing high-accuracy depth information to an application to be used.

In order to accomplish the above object, the present invention provides an apparatus for correcting a disparity map, including a disparity map area setting unit for dividing an area of an object into inside and outside areas using a binary image of a current frame, including left and right images, and a 3D model of a preceding frame, and setting the inside and outside areas in a disparity map of the current frame; a pose estimation unit for estimating a pose of the object using the binary image of the current frame and a binary image of the preceding frame and then obtaining information about a depth of a 2D-projected binary image of the 3D model by changing a pose of the 3D model of the preceding frame; and a disparity map correction unit for correcting the disparity map using the depth information and the disparity map in which the inside and outside areas have been set.

The apparatus may further include a disparity map generation unit for generating the disparity map using the left and right images of the current frame.

Additionally, in order to accomplish the above object, the present invention provides a method of correcting a disparity map, including dividing an area of an object into inside and outside areas using a binary image of a current frame, including left and right images, and a 3D model of a preceding frame; setting the inside and outside areas in a disparity map of the current frame; estimating a pose of the object using the binary image of the current frame and the binary image of the preceding frame; changing a pose of the 3D model of the preceding frame based on the estimated pose of the object; obtaining information about depth of a 2D-projected binary image of the 3D model; and correcting the disparity map using the depth information and the disparity map in which the inside and outside areas have been set.

The method may further include generating the disparity map using the left and right images of the current frame.

BRIEF DESCRIPTION OF THE DRAWINGS

The above and other objects, features and advantages of the present invention will be more clearly understood from the following detailed description taken in conjunction with the accompanying drawings, in which:

FIG. 3 is a flowchart illustrating a method of correcting a disparity map according to an embodiment of the present invention; and FIG. 4 is a flowchart illustrating the step of dividing the area of an object in the method of correcting a disparity map according to the embodiment of the present invention.

DESCRIPTION OF THE PREFERRED EMBODIMENTS

Figure 1:
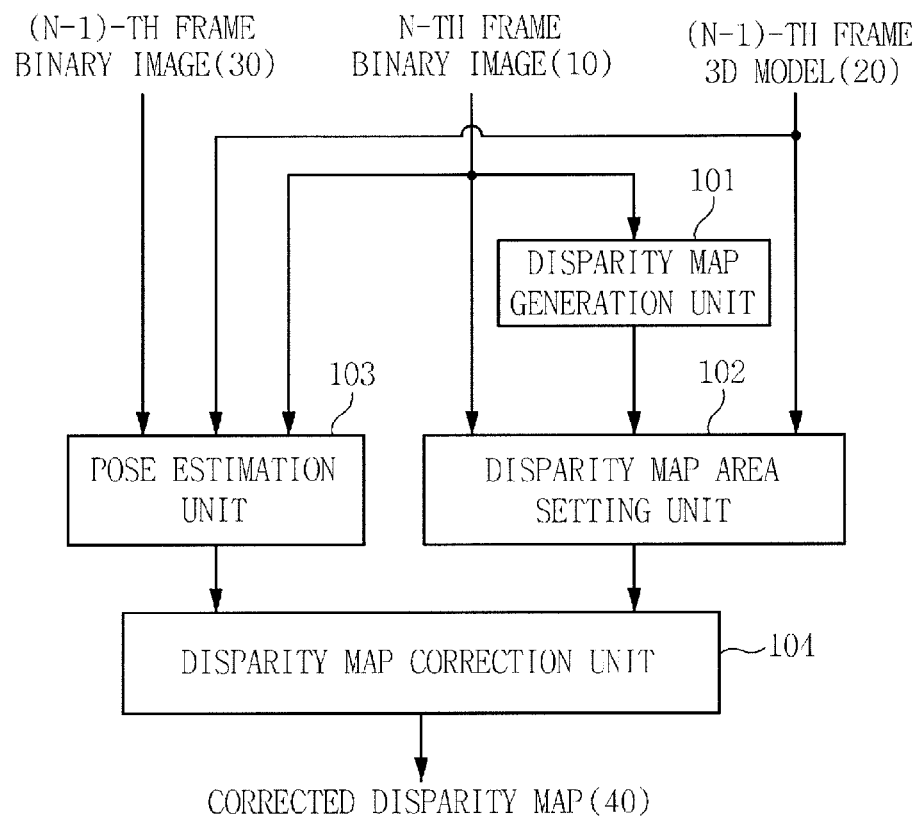
FIG. 1 is a diagram schematically illustrating an apparatus for correcting a disparity map according to an embodiment of the present invention.

Reference now should be made to the drawings, in which the same reference numerals are used throughout the different drawings to designate the same or similar components.

The present invention will be described in detail below with reference to the accompanying drawings. Repetitive descriptions and descriptions of known functions and constructions which have been deemed to make the gist of the present invention unnecessarily vague will be omitted below. The embodiments of the present invention are provided in order to fully describe the present invention to a person having ordinary skill in the art. Accordingly, the shapes, sizes, etc. of elements in the drawings may be exaggerated to make the description clear.

FIG. 1 is a diagram schematically illustrating an apparatus for correcting a disparity map according to an embodiment of the present invention.

Referring to FIG. 1, the apparatus for correcting a disparity map according to the embodiment of the present invention may include a disparity map generation unit 101, a disparity map area setting unit 102, a pose estimation unit 103, and a disparity map correction unit 104. The apparatus for correcting a disparity map shown in FIG. 1 is proposed merely as an embodiment, and all of the blocks shown in FIG. 1 are not mandatory elements. Accordingly, in other embodiments, some blocks may be modified, added, or deleted as necessary. For example, in other embodiments, the apparatus for correcting a disparity map may include all the blocks except for the disparity map generation unit 101.

In FIG. 1, an N-th frame refers to a current frame, and an (N−1)-th frame refers to a preceding frame of the current frame. Furthermore, an N-th frame binary image 10 is the binary image of the current frame, and includes left and right images. Likewise, an (N−1)-th frame binary image 30 is the binary image of the preceding frame, and includes left and right images.

The disparity map generation unit 101 generates a disparity map using the left and right images of the N-th frame binary image 10. That is, the disparity map generation unit 101 generates the disparity map by calculating the X coordinate distances between the coordinate points of the left and right images. This process is referred to as stereo matching. The disparity map generation unit 101 may generate the disparity map using one or more selected from the group consisting of dense stereo matching, sparse stereo matching, local stereo matching, and global stereo matching. Here, the local stereo matching requires high speed, and the global stereo matching requires high performance.

The disparity map area setting unit 102 divides the area of an object into inside and outside areas using the N-th frame binary image 10 and an (N−1)-th frame 3D model 20, and sets the inside and outside areas in the disparity map of the current frame. In an embodiment, the disparity map area setting unit 102 may divide the area of the object into the inside and outside areas by separating the foreground and background regions of the N-th frame binary image 10, projecting the (N−1)-th frame 3D model 20 in two dimensions, and then comparing the N-th frame binary image 10 in which the foreground and background regions have been separated from each other with a 2D projection image. Thereafter, the disparity map area setting unit 102 may set the inside and outside areas in the disparity map of the N-th frame. Here, the disparity map of the N-th frame may be a disparity map generated by the disparity map generation unit 101. An embodiment of the disparity map area setting unit 102 will be described in detail below with reference to the accompanying drawings.

The pose estimation unit 103 estimates the pose of the object using the N-th frame binary image 10 and the (N−1)-th frame binary image 30 and then changes the pose of the (N−1)-th frame 3D model 20, thereby obtaining information about the depth of a 2D-projected binary image of the 3D model. In an embodiment, the pose estimation unit 103 may estimate the pose of the object by obtaining an optical flow between the binary image of the current frame and the binary image of the preceding frame and then estimating information about the motion of the object using the optical flow. The pose estimation unit 103 may obtain information about the depth of the 2D-projected binary image of the 3D model by changing the pose of the (N−1)-th frame 3D model 20 using the estimated pose of the object.

The disparity map correction unit 104 corrects the disparity map using the depth information and the disparity map in which the inside and outside areas have been set. That is, the disparity map correction unit 104 recalculates the disparity ranges of the inside and outside areas by extracting disparity ranges from the depth image, and corrects the disparity map based on the recalculated disparity ranges. The disparity map 40 corrected by the disparity map correction unit 104 is finally output.

If an error is generated in the outside area of the object, the disparity map correction unit 104 may remove the error because the outside area is not an area of interest. If an error is generated in the inside area of the object, the disparity map correction unit 104 may change the disparity map by limiting a stereo matching range based on the depth information (i.e., by setting an area). Here, if a disparity value corresponds to a depth exceeding the area of the object, correction is performed by removing the disparity value. Furthermore, when occlusion attributable to the saturation of an image is generated (i.e., the same point of the left image cannot be found on the right side), a hole is filled using the depth information.

Figure 2:
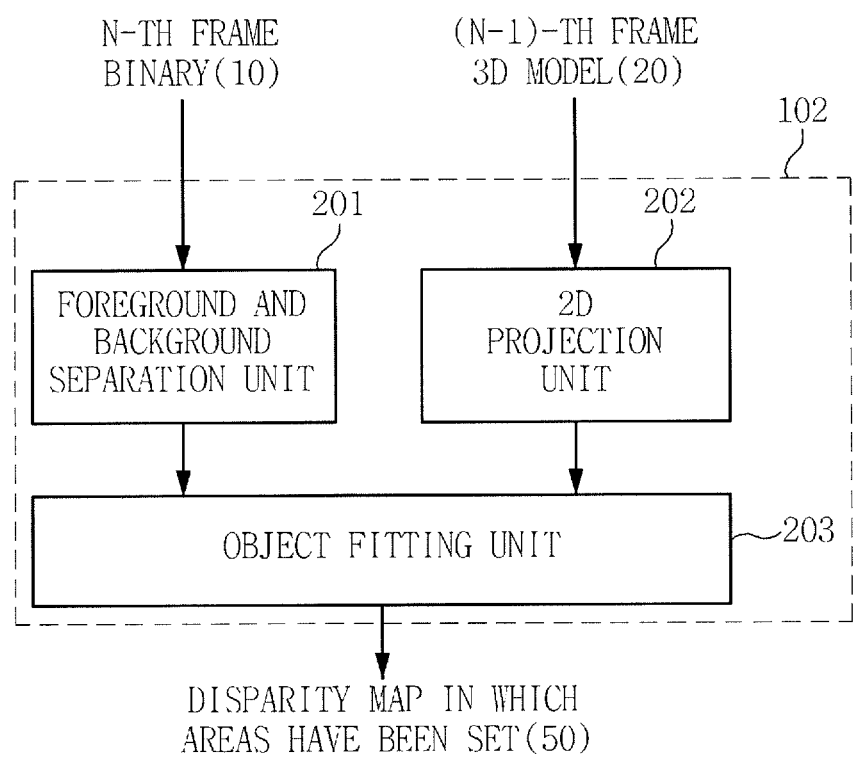
FIG. 2 is a diagram schematically showing the disparity map area setting unit of the apparatus for correcting a disparity map according to an embodiment of the present invention.

FIG. 2 is a diagram schematically showing the disparity map area setting unit of the apparatus for correcting a disparity map according to an embodiment of the present invention.

As described above, the apparatus for correcting a disparity map according to the embodiment of the present invention may divide the area of an object into the inside and outside areas by separating foreground and background regions from the N-th frame binary image 10, projecting the (N−1)-th frame 3D model 20 in two dimensions, and then comparing the N-th frame binary image 10 in which foreground and background regions have been separated from each other with a 2D projection image which is obtained by projecting the (N−1)-th frame 3D model 20. Thereafter, the inside and outside areas may be set in the disparity map of the N-th frame. FIG. 2 shows a configuration that implements this embodiment.

Referring to FIG. 2, the disparity map area setting unit 102 of the apparatus for correcting a disparity map according to the embodiment of the present invention may include a foreground and background separation unit 201, a 2D projection unit 202, and an object fitting unit 203. The disparity map area setting unit shown in FIG. 2 is proposed merely as an embodiment, and all the blocks shown in FIG. 2 are not mandatory elements. In other embodiments, additional blocks may be modified, added or deleted as necessary.

The foreground and background separation unit 201 receives the N-th frame binary image 10, and generates a binary image in which the foreground and background regions have been separated from each other. A foreground and background separation environment may be divided into a static background region in which a background is fixed and a dynamic background region in which a background is moving. The foreground and background separation unit 201 may separate a static background or a dynamic background from the N-th frame binary image 10 as necessary. The foreground and background separation unit 201 may use a known method as necessary.

The 2D projection unit 202 receives the (N−1)-th frame 3D model 20, and generates the 2D-projected binary image. In an embodiment, the 2D projection unit 202 may obtain a size and a position using camera parameters, and generate the 2D-projected binary image by projecting the 3D model of the preceding frame of the binary image using a camera.

The object fitting unit 203 divides the area of the object into inside and outside areas using the 2D-projected binary image and the binary image in which the foreground and background regions have been separated from each other, and sets the inside and outside areas in the disparity map generated from the N-th frame binary image 10. That is, the object fitting unit 203 finds a contour line that divides the inside and outside regions of the object based on the binary image in which the foreground and background regions have been separated from each other. Here, since the binary image in which the foreground and background regions have been separated from each other may include an error, the object fitting unit 203 removes the error using the 2D-projected binary image. Furthermore, the object fitting unit 203 outputs a disparity map 50 to which information about the setting of the inside and outside areas has been added based on information about the contour line of the binary image in which the foreground and background regions have been separated from each other.

As described above, in accordance with the apparatus for correcting a disparity map according to the embodiment of the present invention described with reference to FIGS. 1 and 2, errors can be removed from a disparity map. Errors occurring in a disparity map may be divided into inside errors and outside errors depending on the positions where the errors occur. Outside errors may be removed using the results of separating the foreground and background because an outside area is not an area of interest. Inside errors may be classified into the following two types: a first type of error in which noise makes a value significantly greater or smaller than adjacent disparities, and a second type of error in which a disparity is designated as a meaningless value due to occlusion. In the case of the first type of error, depth information is obtained from the 3D model of the preceding frame and noise is removed using a disparity range. In the case of the second type of error, a hole is filled in using estimation based on a previous model.

When the apparatus for correcting a disparity map according to the embodiment of the present invention is used as described above, a hole can be filled using information about the depth of the 3D model of the preceding frame of an object or a disparity value can be corrected in the case where an attempt to find a corresponding point fails because of saturation in a disparity map or if occlusion occurs for some other reason. Furthermore, inside and outside erroneous disparities can be removed, and meaningful disparity correction is possible. Furthermore, it is possible to perform correction to a disparity most similar to its own disparity because information about the model of its own preceding frame is used.

FIG. 3 is a flowchart illustrating a method of correcting a disparity map according to an embodiment of the present invention.

Referring to FIG. 3, when the method of correcting a disparity map according to the embodiment of the present invention starts, a disparity map is generated using left and right images included in the binary image of a current frame at step S301. Here, the disparity map may be generated using one or more selected from the group consisting of dense stereo matching, sparse stereo matching, local stereo matching, and global stereo matching.

When the disparity map is generated at step S301, the area of an object is divided into inside and outside areas using the binary image of the current frame and the 3D model of a preceding frame at step S302. Here, the area of the object may be divided into the inside and outside areas by separating foreground and background regions from the binary image of the current frame, projecting the 3D model of the preceding frame in two dimensions and then comparing the binary image in which the foreground and background regions have been separated from each other with a 2D projection image.

Once the area of the object has been divided into inside and outside areas at step S302, the inside and outside areas are set in the disparity map of the current frame at step S303.

Thereafter, a pose of the object is estimated using the binary image of the current frame and the binary image of the preceding frame at step S304. The pose of the 3D model of the preceding frame is changed based on the pose of the object at step S305. When the pose of the object is estimated at step S304, the pose of the object may be estimated by obtaining optical flow between the binary image of the current frame and the binary image of the preceding frame and predicting information about the motion of the object using the optical flow.

Thereafter, information about the depth of the 2D-projected binary image of the 3D model is obtained at step S306. The disparity map is corrected using the depth information and the disparity map in which the areas have been set at step S307.

In the method of correcting a disparity map shown in FIG. 3, the process of correcting a disparity map is performed in the same manner as was used in the apparatus for correcting a disparity map according to the embodiment of the present invention shown in FIG. 1, and therefore the same description given in conjunction with FIG. 1 is used unless described otherwise. Accordingly, like those of FIG. 1, all the steps of the flowchart shown in FIG. 3 are not mandatory. In other embodiments, some steps may be modified, added or deleted as necessary. For example, in other embodiments, the method of correcting a disparity map may include all of the steps except for step S301 of generating the disparity map. Furthermore, the steps of the flowchart are not limited to the illustrated sequence, and the sequence may be modified or changed if needed.

FIG. 4 is a flowchart illustrating the step of dividing the area of an object in the method of correcting a disparity map according to the embodiment of the present invention.

The step of dividing the area of an object in the method of correcting a disparity map according to the embodiment of the present invention corresponds to step S302 of FIG. 3.

Referring to FIG. 4, at the step of dividing the area of an object, the binary image of a current frame is received and then a binary image in which foreground and background regions have been separated from each other is generated at step S401. At step S401, the binary image in which foreground and background regions have been separated from each other may be generated by separating a static or dynamic background region from the binary image.

Thereafter, the 3D model of a preceding frame is received and then a 2D-projected binary image is generated based on the 3D model at step S402. At step S402, the 2D-projected binary image may be generated by obtaining a size and a position using camera parameters and then projecting the 3D model of the preceding frame.

Once the binary image in which the foreground and background regions have been separated from each other and the 2D-projected binary image have been generated at steps S401 and S402, the area of the object is divided into inside and outside areas using the binary image in which foreground and background regions have been separated from each other and the 2D-projected binary image at step S403.

Since the step of dividing the area of the object shown in FIG. 4 is performed in the same manner as the operation of the disparity map area setting unit of the apparatus for correcting a disparity map according to the embodiment of the present invention shown in FIG. 2, the same description given in conjunction with FIG. 1 is used unless described otherwise. Accordingly, like those of FIG. 2, all the steps of the flowchart of FIG. 4 are not mandatory. In other embodiments, some steps may be modified, added or deleted as necessary. Furthermore, the steps of the flowchart are not limited to the illustrated sequence, and the sequence may be modified or changed if needed.

The method of correcting a disparity map has been described with reference to the flowcharts shown in the drawings. Although the method has been shown and described using a series of the blocks in order to simplify the description, the present invention is not limited to the sequence of the blocks. Some of the blocks may be performed in a different sequence or at the same time. It is possible to implement various branches, flow paths and sequences of blocks that achieve the same or similar results. Furthermore, all of the blocks shown may not be required to implement the method described in this specification.

The present invention has the advantage of removing the noise of the disparity map attributable to stereo matching and the advantage of filling a hole attributable to occlusion using information about the depth of a 3D model produced in a frame preceding the current frame, thereby improving a disparity map and the depth performance and providing high-accuracy depth information to an application intended to be used.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for correcting a disparity map, comprising:
a disparity map area setting unit implemented by a processor and for dividing an area of an object into inside and outside areas using a binary image of a current frame, including left and right images, and a 3D model of a preceding frame, and setting the inside and outside areas in a disparity map of the current frame;
a pose estimation unit implemented by the processor and for estimating a pose of the object using the binary image of the current frame and a binary image of the preceding frame and then obtaining information about a depth of a 2D-projected binary image of the 3D model by changing a pose of the 3D model of the preceding frame; and
a disparity map correction unit implemented by the processor and for correcting the disparity map using the depth information and the disparity map in which the inside and outside areas have been set,
wherein the disparity map area setting unit comprises:
a foreground and background separation unit implemented by the processor and for receiving the binary image of the current frame, and generating a binary image in which foreground and background regions have been separated from each other;
a 2D projection unit implemented by the processor and for receiving the 3D model of the preceding frame of the binary image, and generating a 2D-projected binary image; and
an object fitting unit implemented by the processor and for dividing the area into the inside and outside areas using the 2D-projected binary image and the binary image in which foreground and background regions have been separated from each other, and setting the inside and outside areas in the disparity map generated using the binary image of the current frame.

2. The apparatus as set forth in claim 1, further comprising a disparity map generation unit implemented by the processor and for generating the disparity map using the left and right images of the current frame.

3. The apparatus as set forth in claim 2, wherein the disparity map generation unit generates the disparity map using one or more selected from the group consisting of dense stereo matching, sparse stereo matching, local stereo matching, and global stereo matching.

4. The apparatus as set forth in claim 1, wherein the foreground and background separation unit separates a static or dynamic background region from the binary image of the current frame.

5. The apparatus as set forth in claim 1, wherein the 2D projection unit generates the 2D-projected binary image by obtaining a size and a position using camera parameters and projecting the 3D model of the preceding frame.

6. The apparatus as set forth in claim 1, wherein the pose estimation unit estimates the pose of the object by obtaining an optical flow between the binary image of the current frame and the binary image of the preceding frame and then estimating information about a motion of the object using the optical flow.

7. A method of correcting a disparity map, comprising:
dividing an area of an object into inside and outside areas using a binary image of a current frame, including left and right images, and a 3D model of a preceding frame;
setting the inside and outside areas in a disparity map of the current frame;
estimating a pose of the object using the binary image of the current frame and the binary image of the preceding frame;
changing a pose of the 3D model of the preceding frame based on the estimated pose of the object;
obtaining information about depth of a 2D-projected binary image of the 3D model; and
correcting the disparity map using the depth information and the disparity map in which the inside and outside areas have been set,
wherein the dividing an area of an object into inside and outside areas comprises:
receiving the binary image of the current frame, and generating a binary image in which foreground and background regions have been separated from each other;
receiving the 3D model of the preceding frame, and generating a 2D-projected binary image; and
dividing the area of the object into inside and outside areas using the 2D-projected binary image and the binary image in which foreground and background regions have been separated from each other.

8. The method as set forth in claim 7, further comprising generating the disparity map using the left and right images of the current frame.

9. The method as set forth in claim 8, wherein the generating a disparity map comprises generating the disparity map using one or more selected from the group consisting of dense stereo matching, sparse stereo matching, local stereo matching, and global stereo matching.

10. The method as set forth in claim 7, wherein the generating a binary image in which foreground and background regions have been separated from each other comprises separating a static or dynamic background region from the binary image of the current frame.

11. The method as set forth in claim 7, wherein the generating a 2D-projected binary image comprises generating the 2D-projected binary image by obtaining a size and a position using camera parameters and then projecting the 3D model of the preceding frame.

12. The method as set forth in claim 7, wherein the estimating a pose of the object comprises estimating the pose of the object by obtaining an optical flow of the binary image of the current frame and the binary image of the preceding frame and then estimating information about a motion of the object based on the optical flow.

13. A method of correcting a disparity map, comprising:
dividing an area of an object into inside and outside areas using a binary image of a current frame, including left and right images, and a 3D model of a preceding frame, wherein the dividing an area of an object into inside and outside areas comprises:
separating foreground and background regions from the binary image of the current frame;
projecting the 3D mode of the proceeding frame in two dimensions; and
comparing the current binary image in which foreground and background regions have been separated from each other with a 2d projection image obtained by projecting the 3d model of the preceding frame in two dimensions by finding a contour line that divides the inside and outside regions of the object based on the binary image in which the foreground and background regions have been separated from each other and removing error using the 2d projected image;
setting the inside and outside areas in a disparity map of the current frame;
estimating a pose of the object using the binary image of the current frame and the binary image of the preceding frame;
changing a pose of the 3D model of the preceding frame based on the estimated pose of the object;
obtaining information about depth of a 2D-projected binary image of the 3D model; and
correcting the disparity map using the depth information and the disparity map in which the inside and outside areas have been set.

* * * * *